United States Patent [19]  [11] 4,274,536
Riegler et al.  [45] Jun. 23, 1981

[54] SHIELDED ROLLER CHAIN

[75] Inventors: Ernst Riegler, Enns; Manfred Schmidt, Linz, both of Austria

[73] Assignee: Voest-Alpine Aktiengesellschaft, Linz, Austria

[21] Appl. No.: 24,304

[22] Filed: Mar. 27, 1979

[30] Foreign Application Priority Data

Apr. 4, 1978 [AT] Austria .................................. 2358/78

[51] Int. Cl.³ .............................................. B65G 17/06
[52] U.S. Cl. .................................... 198/851; 165/120; 432/245
[58] Field of Search ............................... 198/850-853, 198/952; 432/239, 245; 74/245 C, 250 C, 251 C; 165/120

[56] References Cited

U.S. PATENT DOCUMENTS

| 1,414,212 | 4/1922 | Samuelson | 198/850 |
| 1,971,553 | 8/1934 | Fisk | 198/851 |
| 3,529,715 | 9/1970 | Mueller | 198/852 |

FOREIGN PATENT DOCUMENTS 1090987  4/1955  France .................................... 198/851

Primary Examiner—Robert B. Reeves
Assistant Examiner—Douglas D. Watts
Attorney, Agent, or Firm—Brumbaugh, Graves, Donohue & Raymond

[57] ABSTRACT

In a conveying arrangement for accommodating and conveying slabs, including a roller supporting chain whose chain links, at their ends, are connected by articulation pins and have projections that overlap each other, each chain link is provided with a cover plate having load supports that rise above the projections in terms of height.

3 Claims, 6 Drawing Figures

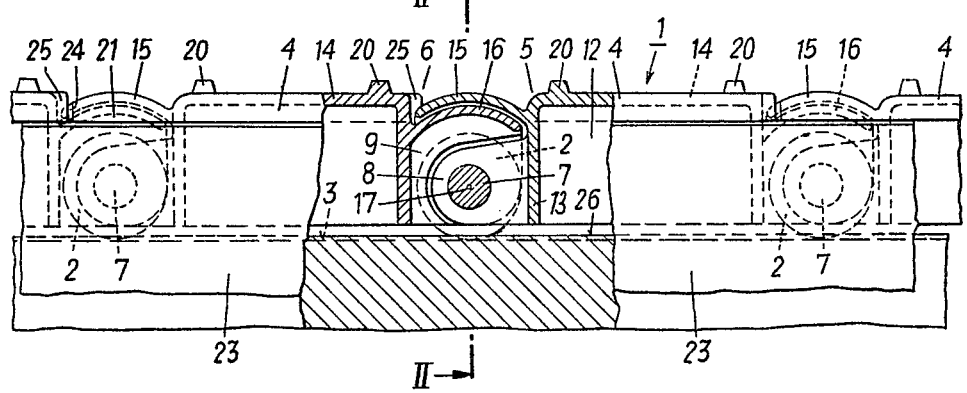
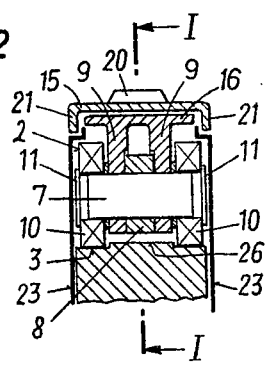
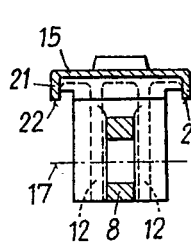
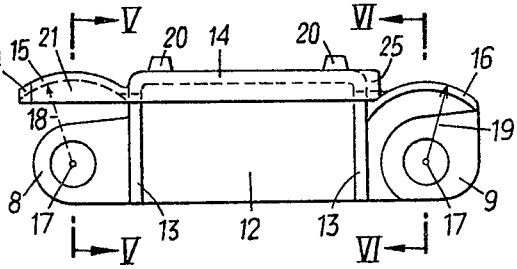
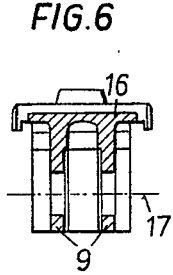
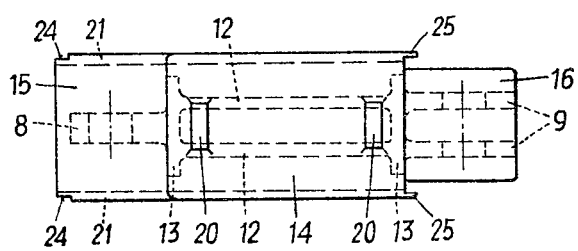

SHIELDED ROLLER CHAIN

BACKGROUND OF THE INVENTION

The invention relates to a conveying arrangement including a roller supporting chain whose chain links, at their ends, are connected by articulation pins and have projections, preferably designed as cylinder segments, that overlap each other.

In the course of the automation of metallurgical plants, the problem of transporting slabs to the processing stations by means of continuous conveyors has increasingly come up.

It is known to use roller supporting chains, i.e. steel lug chains running on rollers, for the heaviest loads. When using such chains in metallurgical plants, in particular for conveying slabs in flame scarfing machines, disturbances of the conveying process will be caused by contamination, in particular from the emerging cinders which deposit both on the chain runway and on the chains themselves. The cinders, which emerge in very fine particles in flame scarfing plants, penetrate into the rolling bearings, thus destroying them.

Furthermore, a conveying arrangement of the initially-described kind is known whose chain links are trough-shaped and which carry shovels that stand off from the links. These shovels serve for transporting solid, fine-particle material. The known conveying arrangement can also be used as a crawler for vehicles. This known chain is not suitable for transporting heavy, one-piece loads, such as slabs, since the shovels that stand off from the links are each arranged on an outer projection at one end of the link that overlaps an inner projection on the adjacent link, thus under load a deformation of these projections will occur, which would cause jamming of this known chain.

SUMMARY OF THE INVENTION

The invention has as its object to provide a conveying arrangement of the initially-defined kind with which deformation of the projections by the load is prevented, so that the movability of the chain remains unrestricted even when conveying the heaviest slabs. Furthermore, the introduction of load onto the chain is to take place at an exactly defined place, so that dimensioning of the chain links with a view to their strength will be facilitated.

These objects are achieved according to the invention in that, for the accommodation and conveyance of slabs, in particular for the conveyance of slabs in a flame scarfing plant, each chain link comprises a plane cover plate having load supports rising above the projections in terms of height. With this arrangement, the projections arranged at the ends of the chain links are free from load strains, so that these projections cannot be deformed by the work pieces to be transported.

It is furthermore advantageous if the outer one of the two overlapping projections each comprises side flanges overlapping the inner projection in the transverse direction of the chain. The side flanges each suitably comprise a straight-line limitation edge that is directed toward and parallel to the runway. The side flanges plus the limitation edges extend over the length of each chain link up to the start of the opposite projection of the same chain link. By this arrangement, it is possible to arrange stationary sealing sheets on both sides of the runway, the upper edges of which sheets extend behind the side flanges of the projections, thus forming a labyrinth-like seal with the side flanges.

A further improvement of the sealing of the chain is achieved in that the side flanges, at one end, comprise a recess directed at a right angle to the limitation edge and, at the other end, comprise a projecting rib corresponding thereto.

BRIEF DESCRIPTION OF THE DRAWINGS

The invention will now be explained in more detail by way of one embodiment illustrated in the accompanying drawings, wherein:

FIG. 1 is a partly sectioned side view along line I—I of FIG. 2 showing some chain links hinged to one another in a conveying arrangement for heavy loads according to the present invention;

FIG. 2 illustrates a section along line II—II of FIG. 1; and

FIGS. 3 to 6 illustrate a chain link, FIG. 3 being a side view and FIG. 4 being a ground plan of this chain link, and FIGS. 5 and 6 showing sections along lines V—V and VI—VI of FIG. 3 respectively.

DESCRIPTION OF AN ILLUSTRATION EMBODIMENT

A roller supporting chain 1 runs by means of rollers 2 on a runway 3. The roller supporting chain 1 is assembled of individual chain links 4 which form a continuously circulating chain. Neighboring chain links 4, at their ends 5, 6, comprise lugs 8, 9 laterally overlapping one another and penetrated by a connecting pin 7. The end 5 of the chain link 4 comprises only one lug 8 whose width is dimensioned such that it can be inserted in between the two lugs 9 provided on the other end 6 of the neighboring chain link. The connecting pin 7, as can be seen from FIG. 2, penetrates the three lugs 8, 9 when they are in overlapping relationship to each other. At the ends of the pin 7, rolling bearings 10 are inserted for running rollers 2 and are secured by plates 11 screwed on at the ends.

Each chain link 4 is provided with two ribs 12 that are parallel to each other, as best seen from FIG. 4. The two ribs 12, at the ends 5, 6 of the chain link 4, are connected with each other by a transverse wall 13 and are covered from above by a cover plate 14. A projection 15, 16 in the form of a segment of a cylinder, is arranged on each transverse wall 13 of the chain links, the cylinder axes of these projections 15, 16 coinciding with the axis 17 of the rollers and the connecting pin.

The projection 15, on the end 5 of each chain link body 4, has a slightly larger cylinder radius 18 at its inner side than has the projection 16 on the end 6 at its outer side (cylinder radius 19), so that the projections 15, 16 overlap each other when the chain link bodies 4 are assembled with the chain stretched (FIG. 1) and the articulate movability about the connecting pin axis 17 is maintained. On the cover plate, load supports 20 rising above the projections 15 in height are provided, whereby it is ensured that the load to be transported by means of the chain directly strains only the cover plate and does not rest on one of the projections 15. As a result the projections 15, 16 are not deformed by the load, which deformation would restrict the movability of the chain. The load supports 20 also have the advantage that the introduction of force by the load takes place in each chain link at an exactly defined place, so that dimensioning of the chain links with a view to their strength is facilitated.

By means of the overlapping projections 15, 16 a labyrinth-like seal is formed. When deflecting the chain about the chain pulleys (not illustrated), the sealing effect is maintained by the projections 15, 16, so that cinders and dirt that accumulate between the upper projection 15 and the transverse wall 13 of the neighbouring chain link are dumped. The size of the gap between the two overlapping projections 15, 16, which is dimensioned as small as possible, is maintained during deflection of the chain over the chain pulleys.

The outer projection 15 overlaps the inner projection 16 not only from above, but also from the side, via side flanges 21 that cover the inner projection 16. These side flanges have straight-line limitation edges 22 that are directed parallel to the runway 3. The flanges and limitation edges extend along each chain link 4, from projection 15 at one end to the start of the projection 16 at the opposite end of the chain link 4. Consequently, it is possible to arrange stationary sheets 23 laterally on the runway, which sheets project into the interior of the chain links 4 behind the flanges 21, whereby a labyrinth-like seal is also effected on the two sides of the roller supporting chain 1. The side flanges 21 at one end of the projection 15 each comprise a vertical recess 24, i.e. a recess that is directed at a right angle to the limitation edge 22. At the other end of link 4 a rib 25, dimensioned so as to correspond to this vertical recess 24, is provided so that the side flanges 21 of neighboring chain links overlap each other, thus further improving the sealing effect of these side flanges.

The chain 1 is secured against lateral displacement by a step-like elevation 26 in the runway by which the rollers 2 are laterally guided (FIG. 2).

The roller supporting chain according to the invention has proved successful in particular in flame scarfing plants that produce microscopically fine cinders. With previously used chains, the cinders have deposited not only on the runway of the chain, but also on the rollers and connecting pins, have caused early destruction of the chains.

The invention is not limited to the embodiment illustrated in the drawings, but can be modified in various ways. For instance, it is possible to mount the rollers not at the connecting pins 7, but to provide each chain link only with one pair of rollers whose axis is fastened on the two vertical studs in the middle thereof below the cover plate 14.

What we claim is:

1. In a conveying arrangement of the type including a roller supporting chain having chain links movable on a runway, articulation pins provided for connecting said chain links at their ends, and projections located at the end of said chain links and overlapping each other, the improvement which is characterized in that:

a plane cover plate is provided on each one of said chain links;

load supports are provided on each plane cover plate for accommodating and conveying slabs, in particular for conveying slabs in a flame scarfing plant, said load supports rising above said projections in terms of height;

said projections are formed by an outer projection and an inner projection provided on each of said chain links, said outer projection of one chain link overlapping said inner projection of a neighboring chain link; and side flanges are provided on said outer projections, said side flanges overlapping each inner projection in the transverse direction of said roller supporting chain, each of said side flanges, in the direction towards said runway, is provided with a straight-line limitation edge parallel to said runway, each of said side flanges, together with its straight-line limitation edge, extends over the length of said chain links from the outer projection up to the start of said inner projection arranged at the opposite end of said chain link.

2. A conveying arrangement as set forth in claim 1, further comprising stationary sealing sheets arranged on both sides of said runway, said stationary sealing sheets having upper edges extending behind said side flanges.

3. A conveying arrangement as set forth in claim 1, wherein said side flanges, at one end are provided with a recess directed at a right angle to said straight-line limitation edge, and at the other end are provided with a projecting rib corresponding to said recess.

* * * * *